United States Patent [19]

Fezza

[11] Patent Number: 5,489,765
[45] Date of Patent: Feb. 6, 1996

[54] ELECTRICAL HEATING SYSTEM WITH AIR-DRIVEN ELECTRICAL GENERATOR

[76] Inventor: Bernard F. Fezza, 110 Beach Rd., Massapequa, N.Y. 11758

[21] Appl. No.: 161,348

[22] Filed: Dec. 6, 1993

[51] Int. Cl.[6] ............................................. H05B 1/02
[52] U.S. Cl. ..................... 219/483; 219/491; 219/494; 219/508; 322/38; 60/325
[58] Field of Search ................................. 219/483–486, 219/490, 491, 494, 508; 290/52, 55, 44, 43; 322/35, 38; 60/659, 676, 325

[56] References Cited

U.S. PATENT DOCUMENTS

| | | | |
|---|---|---|---|
| 3,301,999 | 1/1967 | Chisholm | 219/483 |
| 3,912,906 | 10/1975 | McIntosh et al. | 219/486 |
| 4,229,661 | 10/1980 | Mead et al. | 290/44 |
| 4,347,706 | 9/1982 | Drost | 60/659 |
| 4,352,024 | 9/1982 | Geary et al. | 290/52 |
| 5,296,799 | 3/1994 | Dans | 322/35 |

Primary Examiner—Mark H. Paschall
Attorney, Agent, or Firm—Stephen Clark

[57] ABSTRACT

Compressed air-driven electrical generator supplies electric current to resistance heating element on demand in a baseboard heating system. A thermostat in communication with an air valve actuator, allows compressed air to flow from an air holding tank to an air motor which drives the electric generator whenever the temperature in the control space drops below a pre-selected temperature. An electrical relay switch in series with the electric generator and an electrical resistance heating element opens the electrical circuit between the electric generator and the heating element whenever the temperature sensed by the thermostat drops below the pre-selected temperature.

4 Claims, 3 Drawing Sheets

5,489,765

ELECTRICAL HEATING SYSTEM WITH AIR-DRIVEN ELECTRICAL GENERATOR

FIELD OF INVENTION

The present invention relates to building heating systems. More particularly, the present invention relates to electrical baseboard heating systems and their controls.

BACKGROUND

Electrical baseboard heating systems are well known and widely used, particularly as a means of automatic temperature and humidity regulation for residential buildings and apartments.

Many different types and descriptions of individual components are used in common baseboard heating systems, but virtually all prior residential electrical baseboard heating system have the same basic components. Typically, 120/240 VAC electrical service is provided to the building. A transformer reduces electrical power to approximately 24 VAC for operation of a thremostat. The thermostat is essentially a temperature sensitive switch which, typically, closes when the temperature in the control space drops below a pre-selected minimum temperature. Closure of the thermostat (low voltage) switch typically actuates a normally open relay switch. When the relay switch is closed, house current (i.e. 120 or 240 VAC) energizes a resistance element in the baseboard heater, thereby heating the air space around the heater. When the temperature in the control space exceeds a pre-selected temperature, the thermostatic switch opens, interrupting current to the relay, thus causing the baseboard heater to become turned off.

SUMMARY OF THE INVENTION

It is a primary object of the present invention to provide an electrical resistance baseboard heating system wherein electrical energy to the baseboard heating element is generated by an air powered electrical generator.

It is another object of the present invention to provide a heating system of the character described which eliminates the need for any fluid piping systems which could become susceptible to freezing.

It is another object of the present invention to provide a system of the character described which is environmentally clean.

It is another object of the present invention to provide a heating system of the character described wherein the air powered electrical generator operates off of pressurized air produced by an electrical compressor. It is another object of the present invention to provide a device of the character described wherein the electrical compressor may be used during cooling seasons in conjunction with an air conditioning system to produce cooling air.

It is another object of the present invention to provide a system of the character described in which the compressor may be used for additional (i.e. non-heating) purposes such as to operate air power tools, to inflate tires and the like, and/or to flush sprinkling system.

Further objects and advantages of my invention will become apparent from a consideration of the drawings and ensuing description thereof.

DESCRIPTION OF THE PREFERRED EMBODIMENT

The present invention is an electrical baseboard heating system which may, for example, be used in a residential building.

Figure 1:
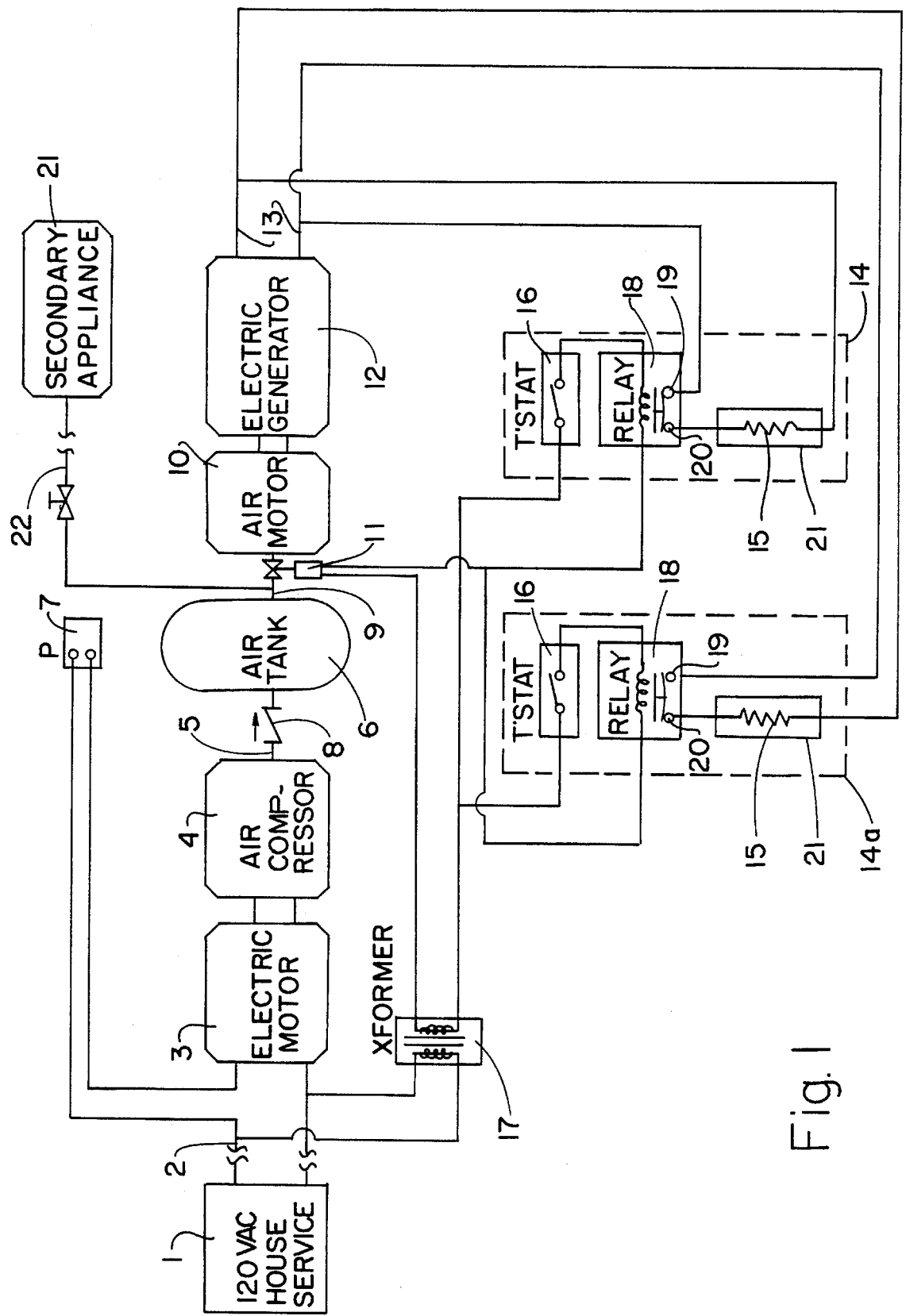
FIG. 1 is a schematic diagram of the preferred embodiment of the present invention.

Referring to FIG. 1: Electrical service (1) is provided to the building from an outside power source, (such as the local electric company). Preferably the electrical service (1) is 120 VAC, but may be 240 VAC or any other common electrical service.

A ¾-horsepower electric motor (3), which is powered by the 120 VAC house current (2), drives an air compressor (4). The outlet (5) from the air compressor (4) is connected to a compressed air tank (6). The air tank (6) is provided with a pressure switch (7) which preferably maintains the air pressure within the air tank (6) between 145 and 175 psi. When the pressure inside of the air tank (6) drops below 145 psi the pressure switch (7) closes, thus completing the electrical circuit to the compressor motor (3) and causing the compressor (4) to turn on. When the pressure inside of the air tank (6) reaches 175 psi the pressure switch (7) opens, thus opening the electrical circuit to the compressor motor (3) and causing the compressor (4) to turn off. A check valve (8) may be provided at the outlet (5) of the compressor (4).

The air tank (6) is connected to an air motor (10) via an air line (9), which may be constructed of pressure tubing, hosing, piping or other appropriate conduit material. A normally closed solenoid actuated air valve (11) is disposed in the air line (9). When energized, the solenoid actuated air valve (11) opens, thus allowing pressurized air to pass from the air tank (6) to the air motor (10) via air line (9).

When the air valve (11) is open, pressurized air powers the air motor (10) which, in turn, drives an electrical generator (12). The output (13) from the electrical generator (12) is, of course, in the form of electrical energy.

In the figures, a typical temperature control space (14) (such as a room) is indicated by a dashed line. A thermostat (16) and a baseboard heater (21) comprising a electrical resistance heating element (15) are located inside of the control space (14). The thermostat (16) is connected to a 24 volt transformer (17) which, in turn, is connected to the house current (2). The thermostat (16) is in electrical communication with a relay switch (18). The relay switch (18) may be of common construction (for example, controller Type RA89 as manufactured by Honeywell Corporation). The relay (18) is a normally open switch which only closes when it is electrically actuated by the closing of the thermostat (16) switch.

One terminal (19) of the relay switch is connected directly to the output (13) from the electric generator (12); and a second terminal (20) of the relay switch is connected directly to the electrical resistance heating element (15) of the baseboard heater.

When the temperature inside of the control space (14) drops below a pre-selected temperature, the thermostat (16)

closes, thus completing the (low voltage) circuit to the solenoid actuated air valve (11) and completing the (high voltage) circuit to the relay switch (18). When the air valve (11) opens, it causes pressurized air from the air tank (6) to drive the air motor (10), which drives the electrical generator (12), which produces high voltage electric power at its output (13). When the relay switch (18) closes, it completes the electrical circuit from the electric generator (12) to the electrical resistance heating element (15), thus causing the heating element (15) to heat up the control space (14).

When the control space (14) reaches the desired preselected temperature the thermostat (16) opens, thus de-energizing the solenoid actuated air valve (11) and the relay switch (18), which, in turn, turns off the electric generator (12) and the baseboard heater (21).

In the preferred embodiment of the invention a plurality of control spaces (14) and (14a), each having its own thermostat (16), relay (18) and baseboard heater (21), are connected in parallel. FIG. 1 illustrates how a second control space (14a) may be connected in parallel with the first control space (14) so that the temperature in each space may be individually controlled. Although only two "control spaces" are illustrated in FIG. 1, it will be appreciated by those skilled in the art that any number of similarly configured control spaces may be added in a like manner.

It will be understood from a review of the above disclosure that when the present invention is used to control the temperatures in a plurality of parallel control spaces, whenever at least one of the (parallel wired) thermostats (16) closes, the solenoid actuated air valve (11) will open, thus causing electricity to be generated by the electrical generator (12). However, the baseboard heater (21) inside any particular control space (14) will only become energized if and when the thermostat (16) in that particular control space (14) closes (and thereby closes the relay switch (18) in that particular control space).

Figure 2:
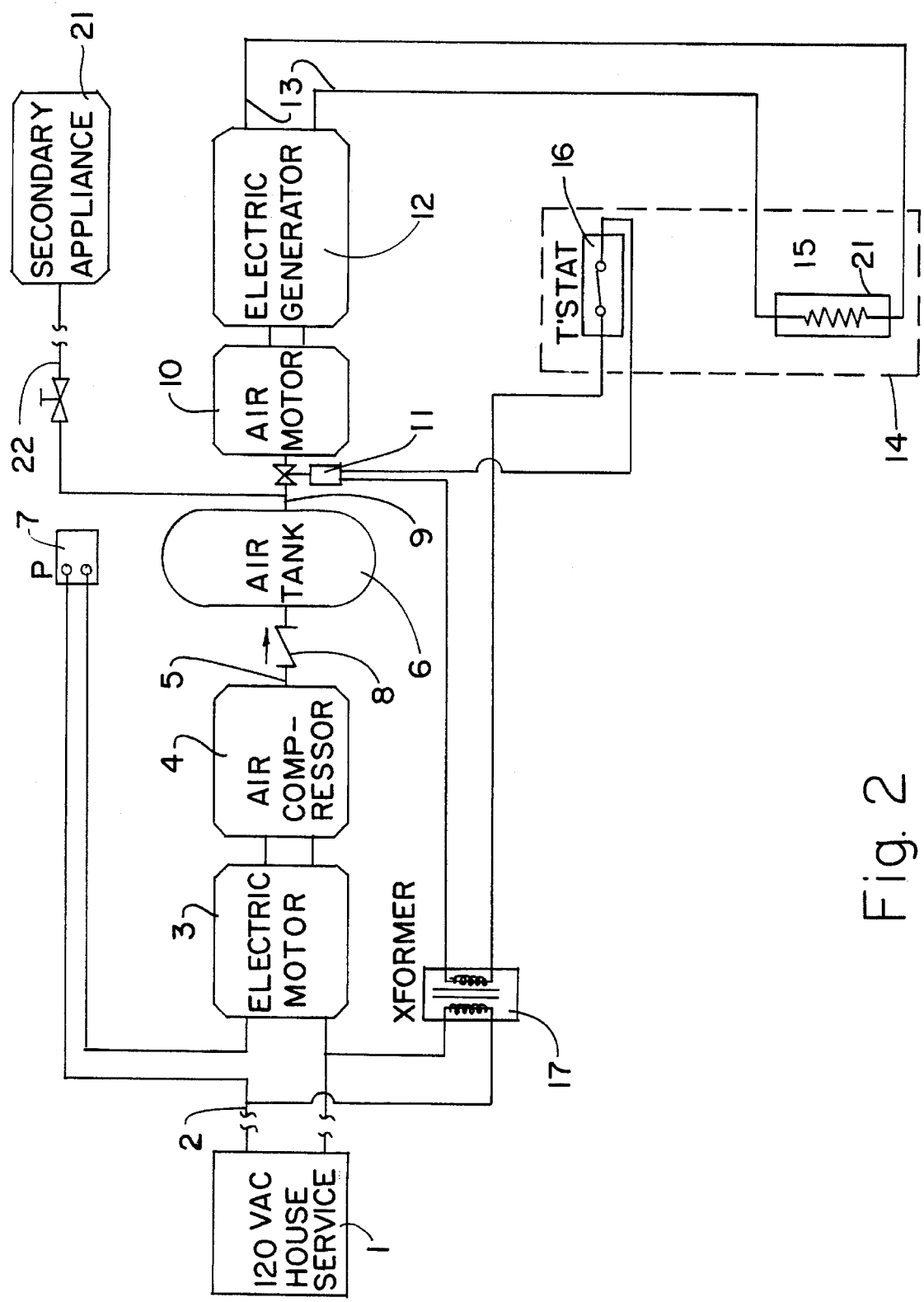
FIG. 2 is a schematic diagram illustrating a single-thermostat controlled embodiment of the present invention.

FIG. 2 illustrates a modification of the heating system of the present invention wherein a single thermostat (16) and baseboard heater (21) are used to control the temperature of a single control space (14). Whenever the present invention is used to control the temperature in only a single control space (14) (that is, when there is only one thermostat (16) in the system), the baseboard heater (15) may be connected directly to the electric generator (12) (i.e. without an intermediate relay switch), because the electric generator (12) will be turned off anytime the (single) thermostat (16) is open, as illustrated in FIG. 2.

One or more secondary appliances (21) may be connected to the air tank (6) via an air line (22). The secondary appliance (21) can be any common air powered device (such as air powered drills, wrenches, etc.), or a fitting (such as a nozzle or the like) which allows the pressurized air to be used to flush sprinkler systems, to inflate tires, etc. Many facilities (such a garages and small machine shops) are frequently equipped with compressed air equipment (i.e. compressors and air tanks), but many such facilities have either inadequate heating systems or no heating systems at all. It may be appreciated by those skilled in the art that a facility which is equipped with a compressed air system (i.e. has means for maintaining 145 to 175 psi of compressed air in an air tank) can be readily adapted in accordance with the present invention to run a thermostatically controlled electrical baseboard heater. In addition, if the thermostat (16) is adapted to run off of low voltage battery (23) power, as illustrated in FIG. 3, a facility which is equipped only with a compressed air system (i.e. has means for maintaining 145 to 175 psi of compressed air in an air tank) can be readily adapted in accordance with the present invention to run a thermostatically controlled electrical baseboard heater, even if that facility otherwise has no electrical service.

During warm weather months when there is a demand for cooling rather than heating inside of the control space, the motor (3) can be used to drive an air conditioning compressor, thus providing useful service year round.

Figure 3:
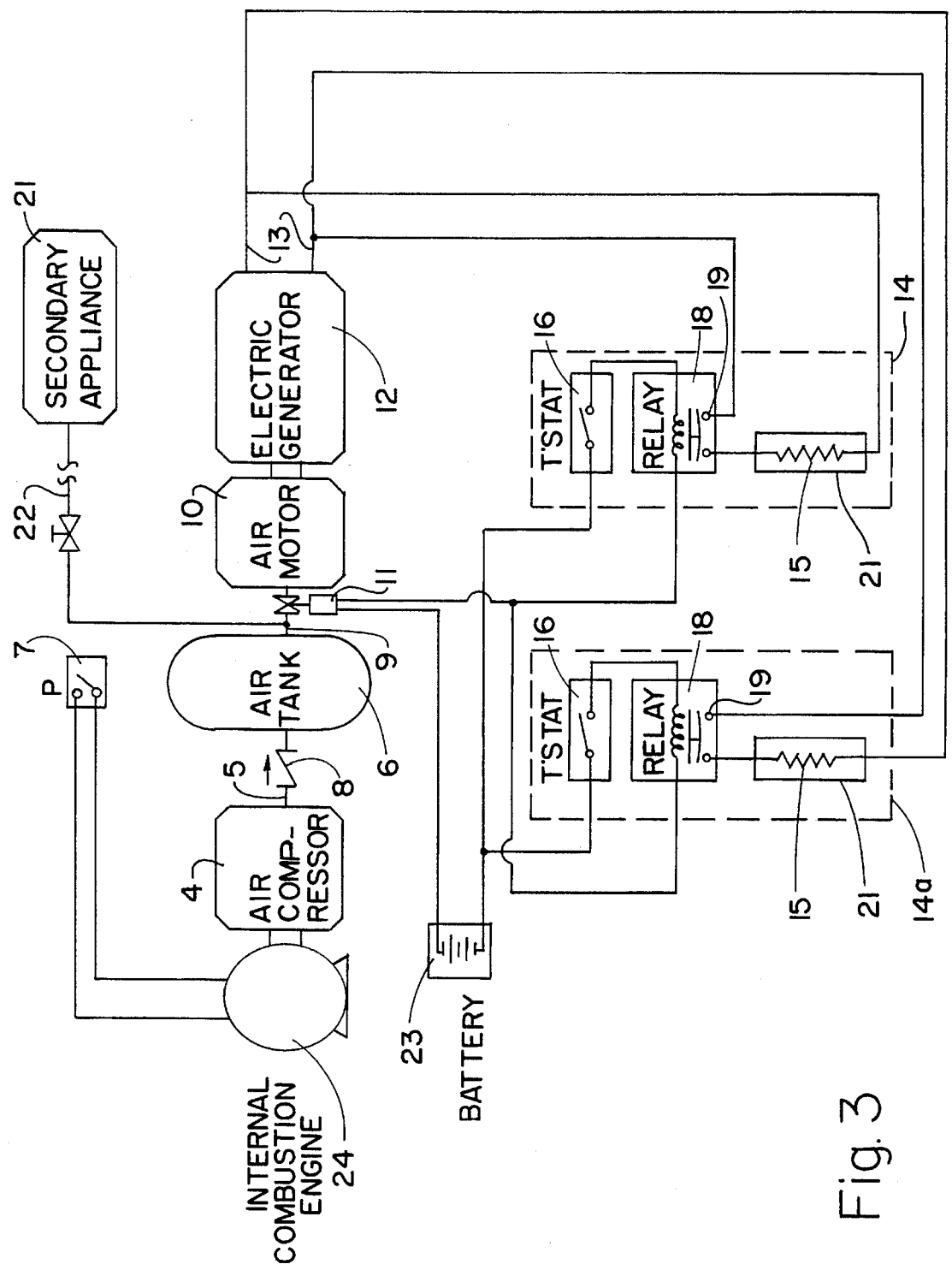
FIG. 3 is a schematic diagram of a modification of the present invention showing a internal combustion-powered air compressor and a battery-powered thermostat.

FIG. 3 illustrates a modification of the present invention wherein an electrical resistance baseboard heating system made in accordance with the present invention operates off of a gasoline powered internal combustion 24 which drives the air compressor (4).

While the above description contains many specificities, these should not be construed as limitations on the scope of the invention, but rather as an exemplification of one preferred embodiment thereof. Many other variations are possible, for example:

The thermostat (16) may operate from either alternating current or direct current;

The actuator for the air valve (11) may be other than a solenoid; and,

The output (13) from the electric generator may be direct current, in which case end of the baseboard electrical resistance conductor may be grounded Accordingly, the scope of the invention should be determined not by the embodiment illustrated, but by the appended claims and their legal equivalents.

I claim:

1. A heating system comprising:

a first electrical power supply (1); an electric motor (3), said electric motor (3) being connected to said first electrical power supply (1) by a first electrical conductor (2);

said electric motor (3) being mechanically connected to an air compressor (4), whereby said electric motor may mechanically drive said air compressor;

and said air compressor (4) having an air discharge outlet (5);

said air discharge outlet (5) being connected to a compressed air storage tank (6);

said compressed air storage tank (6) having a tank outlet conduit (9);

said tank outlet conduit (9) being connected to an air motor (10), whereby compressed air from said air storage tank may drive said air motor;

an electrical power generator (12) mechanically connected to said air motor (10), whereby said air motor may drive said electric generator;

a first electrical resistance heating member (15) electrically connected to said electrical generator (12) by a second electrical conductor member (13);

temperature dependent means for controlling air flow from said air tank (6) to said air motor (10);

and temperature dependent means for controlling electrical power to said first electrical resistance heating member (15);

wherein said temperature dependent means for controlling air flow from said air tank to said air motor comprises:

air flow regulating means disposed within said tank outlet conduit (9), said air flow regulating means comprising an air control valve member having an electrical actuator (11), said electrical actuator (11) being connected to said first power supply (1);

and a first thermostatic switch member (16) disposed between said electrical actuator (11) to said first electrical power supply (1), whereby electrical power to said electrical actuator (11) may be interrupted by the opening of said first thermostatic switch member when said first thermostatic switch member senses a preselected minimum temperature;

and wherein said temperature dependent means for controlling electrical power to said first electrical resistance heating member comprises:

a first relay switch member (18) connected to said first electrical resistance heating member (15) and to said electrical generator (12), whereby electrical current flow from said electrical generator to said first electrical resistance heating member may be interrupted when said first relay switch member is in an open position;

and said first relay switch member (18) being connected to said first thermostatic switch member (16), such that said first relay switch member may be caused to be in an open position when said first thermostatic switch member senses a preselected temperature.

2. The invention according to claim 1 further comprising:

a second electrical resistance heating member (15) electrically connected to said electrical generator (12) by said second electrical conductor member (13);

and temperature dependent means for controlling electrical power to said second electrical resistance heating member (15);

and wherein said temperature dependent means for controlling air flow from said air tank to said air motor further comprises:

a second thermostatic switch member (16) disposed between said electrical actuator (11) to said first electrical power supply (1), whereby electrical power to said electrical actuator (11) may be interrupted by the opening of each of said first and second thermostatic switch members;

and wherein said temperature dependent means for controlling electrical power to said second electrical resistance heating member comprises:

a second relay switch member (18) connected to said second electrical resistance heating member (15) and to said electrical generator (12), whereby electrical current flow from said electrical generator to said second electrical resistance heating member may be interrupted when said second relay switch member is in an open position;

and said second relay switch member (18) being connected to said second thermostatic switch member (16), such that said second relay switch member may be caused to be in an open position when said second thermostatic switch member senses a preselected temperature.

3. A heating system comprising:

a first electrical power supply (1);

a second electrical power supply (23);

an electric motor (3), said electric motor (3) being connected to said first electrical power supply (1) by a first electrical conductor (2);

said electric motor (3) being mechanically connected to an air compressor (4), whereby said electric motor may mechanically drive said air compressor;

and said air compressor (4) having an air discharge outlet (5);

said air discharge outlet (5) being connected to a compressed air storage tank (6);

said compressed air storage tank (6) having a tank outlet conduit (9);

said tank outlet conduit (9) being connected to an air motor (10), whereby compressed air from said air storage tank may drive said air motor;

an electrical power generator (12) mechanically connected to said air motor (10), whereby said air motor may drive said electric generator;

a first electrical resistance heating member (15) electrically connected to said electrical generator (12) by a second electrical conductor member (13);

temperature dependent means for controlling air flow from said air tank (6) to said air motor (10);

and temperature dependent means for controlling electrical power to said first electrical resistance heating member (15);

wherein said temperature dependent means for controlling air flow from said air tank to said air motor comprises:

air flow regulating means disposed within said tank outlet conduit (9), said air flow regulating means comprising an air control valve member having an electrical actuator (11), said electrical actuator (11) being connected to said second power supply (23);

and a first thermostatic switch member (16) disposed between said electrical actuator (11) to said second electrical power supply (23), whereby electrical power to said electrical actuator (11) may be interrupted by the opening of said first thermostatic switch member when said first thermostatic switch member senses a preselected minimum temperature;

and wherein said temperature dependent means for controlling electrical power to said first electrical resistance heating member comprises:

a first relay switch member (18) connected to said first electrical resistance heating member (15) and to said electrical generator (12), whereby electrical current flow from said electrical generator to said first electrical resistance heating member may be interrupted when said first relay switch member is in an open position;

and said first relay switch member (18) being connected to said first thermostatic switch member (16), such that said first relay switch member may be caused to be in an open position when said first thermostatic switch member senses a preselected temperature.

4. The invention according to claim 3 further comprising:

a second electrical resistance heating member (15) electrically connected to said electrical generator (12) by said second electrical conductor member (13);

and temperature dependent means for controlling electrical power to said second electrical resistance heating member (15);

and wherein said temperature dependent means for controlling air flow from said air tank to said air motor further comprises:

a second thermostatic switch member (16) disposed between said electrical actuator (11) to said second electrical power supply (1), whereby electrical power to said electrical actuator (11) may be interrupted by the opening of each of said first and second thermostatic switch members;

and wherein said temperature dependent means for controlling electrical power to said second electrical resistance heating member comprises:

a second relay switch member (18) connected to said second electrical resistance heating member (15) and to said electrical generator (12), whereby electrical current flow from said electrical generator to said second electrical resistance heating member may be interrupted when said second relay switch member is in an open position;

and said second relay switch member (18) being connected to said second thermostatic switch member (16), such that said second relay switch member may be caused to be in an open position when said second thermostatic switch member senses a preselected temperature.

\* \* \* \* \*